US012608046B2

(12) United States Patent
Smith et al.

(10) Patent No.: US 12,608,046 B2
(45) Date of Patent: Apr. 21, 2026

(54) COMPUTING SYSTEM

(71) Applicant: Lenovo (Singapore) Pte. Ltd.,
Singapore (SG)

(72) Inventors: Madison Smith, Santa Rosa, CA (US);
Yoshihito Nakagaki, Yokohama (JP)

(73) Assignee: LENOVO (SINGAPORE) PTE. LTD.,
Singapore (SG)

( * ) Notice: Subject to any disclaimer, the term of this
patent is extended or adjusted under 35
U.S.C. 154(b) by 218 days.

(21) Appl. No.: 18/378,054

(22) Filed: Oct. 9, 2023

(65) Prior Publication Data

US 2025/0117043 A1      Apr. 10, 2025

(51) Int. Cl.
*G06F 1/16* (2006.01)

(52) U.S. Cl.
CPC .......... *G06F 1/1647* (2013.01); *G06F 1/1616*
(2013.01); *G06F 1/1654* (2013.01); *G06F*
*1/1669* (2013.01)

(58) Field of Classification Search
CPC .... G06F 1/1624; G06F 1/1647; G06F 1/1649;
G06F 1/165; G06F 1/1654; G06F 1/1669;
G06F 1/1677; G06F 1/1683
See application file for complete search history.

(56) References Cited

U.S. PATENT DOCUMENTS

| | | | | |
|---|---|---|---|---|
| 5,049,863 A * | 9/1991 | Oka | ....................... | G06F 3/0231 |
| | | | | 708/131 |
| 5,278,730 A * | 1/1994 | Kikinis | ................. | G06F 1/1656 |
| | | | | 361/679.55 |

| | | | | |
|---|---|---|---|---|
| 5,739,810 A * | 4/1998 | Merkel | ................. | G06F 1/1616 |
| | | | | 361/679.2 |
| 5,793,355 A * | 8/1998 | Youens | ................. | G06F 1/1616 |
| | | | | 345/157 |
| 5,847,698 A * | 12/1998 | Reavey | ............... | G06F 15/0283 |
| | | | | 361/679.04 |
| 5,886,686 A * | 3/1999 | Chen | ..................... | G06F 3/0213 |
| | | | | 345/157 |
| 5,966,284 A * | 10/1999 | Youn | ..................... | G06F 1/1669 |
| | | | | 361/679.17 |
| 6,163,326 A * | 12/2000 | Klein | ................... | G06F 1/1616 |
| | | | | 361/679.1 |
| 6,697,251 B1 * | 2/2004 | Aisenberg | ............... | G06F 1/169 |
| | | | | 361/679.55 |
| 6,700,773 B1 * | 3/2004 | Adriaansen | ........... | G06F 1/1643 |
| | | | | 361/679.08 |
| 7,505,252 B2 * | 3/2009 | Ma | ........................ | G06F 1/1616 |
| | | | | 455/556.1 |
| 8,634,873 B2 * | 1/2014 | Jones | ................. | H04M 1/0247 |
| | | | | 455/66.1 |

(Continued)

FOREIGN PATENT DOCUMENTS

| | | | | |
|---|---|---|---|---|
| CN | 114461019 B | * | 9/2024 | ........... G06F 1/1618 |

*Primary Examiner* — Adrian S Wilson
(74) *Attorney, Agent, or Firm* — Brian J. Pangrle

(57) ABSTRACT

A computing system can include a base housing that
includes a base side and an opposing unit recess side that
includes a unit recess; a display housing that includes a back
side and an opposing display side that includes a display; a
hinge assembly that couples the base housing and the
display housing; and a unit receivable in the unit recess,
where the unit includes a physical keyboard side that
includes a physical keyboard and an opposing auxiliary
display side that includes an auxiliary display.

20 Claims, 13 Drawing Sheets

(56)                    References Cited

U.S. PATENT DOCUMENTS

| | | | | |
|---|---|---|---|---|
| 8,749,963 B2 * | 6/2014 | Staats | G06F 1/1616 248/346.03 |
| 8,837,131 B1 * | 9/2014 | Colby | G06F 1/1667 361/679.29 |
| 9,013,863 B2 * | 4/2015 | Hsu | G06F 1/1669 361/679.01 |
| 9,098,245 B2 * | 8/2015 | Lee | G06F 1/1626 |
| 9,335,793 B2 * | 5/2016 | Rothkopf | G06F 1/1643 |
| 10,254,803 B1 * | 4/2019 | Quinn | G06F 1/1688 |
| 10,620,714 B2 * | 4/2020 | Clark | G06F 3/0231 |
| 10,754,390 B2 * | 8/2020 | Quinn | G06F 1/1669 |
| 10,915,147 B2 * | 2/2021 | Liang | G06F 3/0416 |
| 10,929,016 B1 * | 2/2021 | Liu | G06F 1/1643 |
| 10,976,779 B1 * | 4/2021 | Tsai | G06F 1/1615 |
| 10,983,567 B1 * | 4/2021 | Files | G06F 1/1673 |
| 10,989,978 B1 * | 4/2021 | Tsen | G06F 3/04886 |
| 10,990,204 B1 * | 4/2021 | Trim | G06F 1/1669 |
| 11,009,907 B2 * | 5/2021 | Hong | G06F 1/1694 |
| 11,017,742 B2 * | 5/2021 | Pelissier | G06F 1/3262 |
| 11,023,016 B2 * | 6/2021 | Kim | G06F 3/0221 |
| 11,036,260 B2 * | 6/2021 | Smith | G06F 1/1626 |
| 11,068,073 B2 * | 7/2021 | Gatson | G06F 1/3215 |
| 11,119,621 B2 * | 9/2021 | Schenone | G06F 1/1662 |
| 11,169,653 B2 * | 11/2021 | Aurongzeb | G06F 1/1675 |
| 11,221,759 B2 * | 1/2022 | Klein | G06F 1/169 |
| 11,237,643 B2 * | 2/2022 | Kulkarni | G06F 1/1681 |
| 11,262,794 B2 * | 3/2022 | Wen | G06F 3/0202 |
| D949,845 S * | 4/2022 | Wu | D14/315 |
| 11,347,367 B2 * | 5/2022 | Hong | G06F 1/1641 |
| 11,579,663 B1 * | 2/2023 | Files | G06F 1/1637 |
| 11,586,296 B2 * | 2/2023 | Morrison | G06F 3/0393 |
| 11,650,631 B2 * | 5/2023 | Watamura | F16M 11/10 361/679.26 |
| 11,656,654 B2 * | 5/2023 | Hong | G06F 1/1624 361/679.27 |
| 11,662,777 B2 * | 5/2023 | Ku | G06F 1/1662 345/158 |
| 11,841,744 B2 * | 12/2023 | Kim | G06F 1/1669 |
| 11,907,022 B2 * | 2/2024 | Ku | G06F 1/1616 |
| 12,019,472 B2 * | 6/2024 | Perelli | G06F 1/1681 |
| 12,222,769 B2 * | 2/2025 | Morrison | G06F 1/1681 |
| 12,298,815 B2 * | 5/2025 | Nakagaki | G06F 1/1616 |
| 2002/0024499 A1 * | 2/2002 | Karidis | G06F 1/1626 345/156 |
| 2002/0048975 A1 * | 4/2002 | Horikoshi | G06F 1/1688 439/78 |
| 2004/0012509 A1 * | 1/2004 | Chen | G06F 1/1669 361/679.17 |
| 2004/0108968 A1 * | 6/2004 | Finke-Anlauff | G06F 1/1616 345/1.1 |
| 2004/0190239 A1 * | 9/2004 | Weng | G06F 1/1669 361/679.2 |
| 2007/0097014 A1 * | 5/2007 | Solomon | G06F 1/1616 345/1.1 |
| 2007/0203963 A1 * | 8/2007 | Chen | G06F 1/1616 708/100 |
| 2009/0111508 A1 * | 4/2009 | Yeh | H04M 1/0256 455/575.8 |
| 2010/0014235 A1 * | 1/2010 | Huang | G06F 1/1613 361/679.09 |
| 2010/0172081 A1 * | 7/2010 | Tian | G06F 1/1632 361/679.55 |
| 2010/0195279 A1 * | 8/2010 | Michael | G06F 1/1632 361/679.41 |
| 2010/0271771 A1 * | 10/2010 | Wu | G06F 1/1616 361/679.17 |
| 2010/0328549 A1 * | 12/2010 | Wu | G06F 1/1662 348/744 |
| 2011/0199727 A1 * | 8/2011 | Probst | G06F 1/1632 361/679.09 |
| 2011/0222238 A1 * | 9/2011 | Staats | G06F 1/1632 361/679.55 |
| 2011/0230178 A1 * | 9/2011 | Jones | H04M 1/0241 455/566 |
| 2011/0267757 A1 * | 11/2011 | Probst | G06F 1/1616 361/679.09 |
| 2012/0068832 A1 * | 3/2012 | Feldstein | G06F 1/1632 340/12.5 |
| 2012/0106059 A1 * | 5/2012 | Probst | G06F 1/1681 29/434 |
| 2013/0069878 A1 * | 3/2013 | Li | G06F 1/166 345/168 |
| 2014/0204519 A1 * | 7/2014 | Wu | G06F 1/1669 361/679.17 |
| 2014/0204520 A1 * | 7/2014 | Wu | G06F 1/1669 361/679.17 |
| 2014/0205799 A1 * | 7/2014 | Lin | G06F 1/1628 428/138 |
| 2017/0069299 A1 * | 3/2017 | Kwak | G09G 5/37 |
| 2017/0255320 A1 * | 9/2017 | Kumar | G06F 3/04883 |
| 2018/0188774 A1 * | 7/2018 | Ent | G06F 1/1616 |
| 2020/0050243 A1 * | 2/2020 | Kim | G06F 3/0221 |
| 2020/0245483 A1 * | 7/2020 | Alva | G06F 1/1615 |
| 2020/0349895 A1 * | 11/2020 | Files | G09G 3/20 |
| 2020/0349903 A1 * | 11/2020 | Pelissier | G06F 3/0393 |
| 2021/0096741 A1 * | 4/2021 | Klein | G06F 1/1647 |
| 2021/0223825 A1 * | 7/2021 | Seiler | G06F 1/3215 |
| 2021/0334417 A1 * | 10/2021 | Morrison | E05B 73/0082 |
| 2022/0206527 A1 * | 6/2022 | Perelli | G06F 1/1626 |
| 2024/0201748 A1 * | 6/2024 | Nakagaki | G06F 1/1675 |

* cited by examiner

Figure 11:
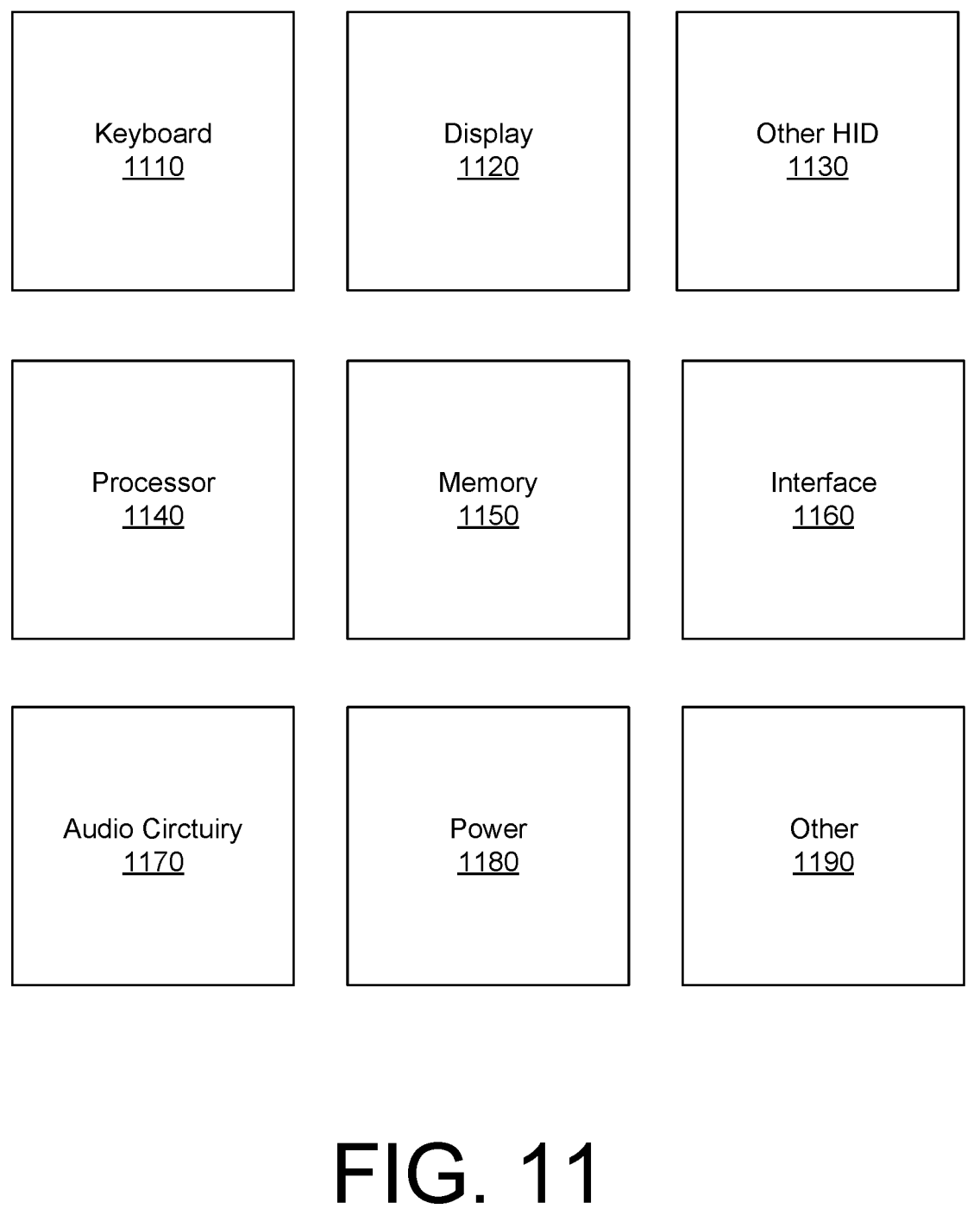

| Keyboard 1110 | Display 1120 | Other HID 1130 |
| --- | --- | --- |
| Processor 1140 | Memory 1150 | Interface 1160 |
| Audio Circtuiry 1170 | Power 1180 | Other 1190 |

COMPUTING SYSTEM

TECHNICAL FIELD

Subject matter disclosed herein generally relates to technology for computing devices or systems.

BACKGROUND

A computing device can include housings where one housing is coupled to another housing via one or more hinge assemblies. For example, consider a notebook computing device that may have a clamshell configuration of a keyboard housing and a display housing that can be closed and opened via one or more hinge assemblies.

SUMMARY

A computing system can include a base housing that includes a base side and an opposing unit recess side that includes a unit recess; a display housing that includes a back side and an opposing display side that includes a display; a hinge assembly that couples the base housing and the display housing; and a unit receivable in the unit recess, where the unit includes a physical keyboard side that includes a physical keyboard and an opposing auxiliary display side that includes an auxiliary display. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 11 is a diagram of an example of a unit;

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
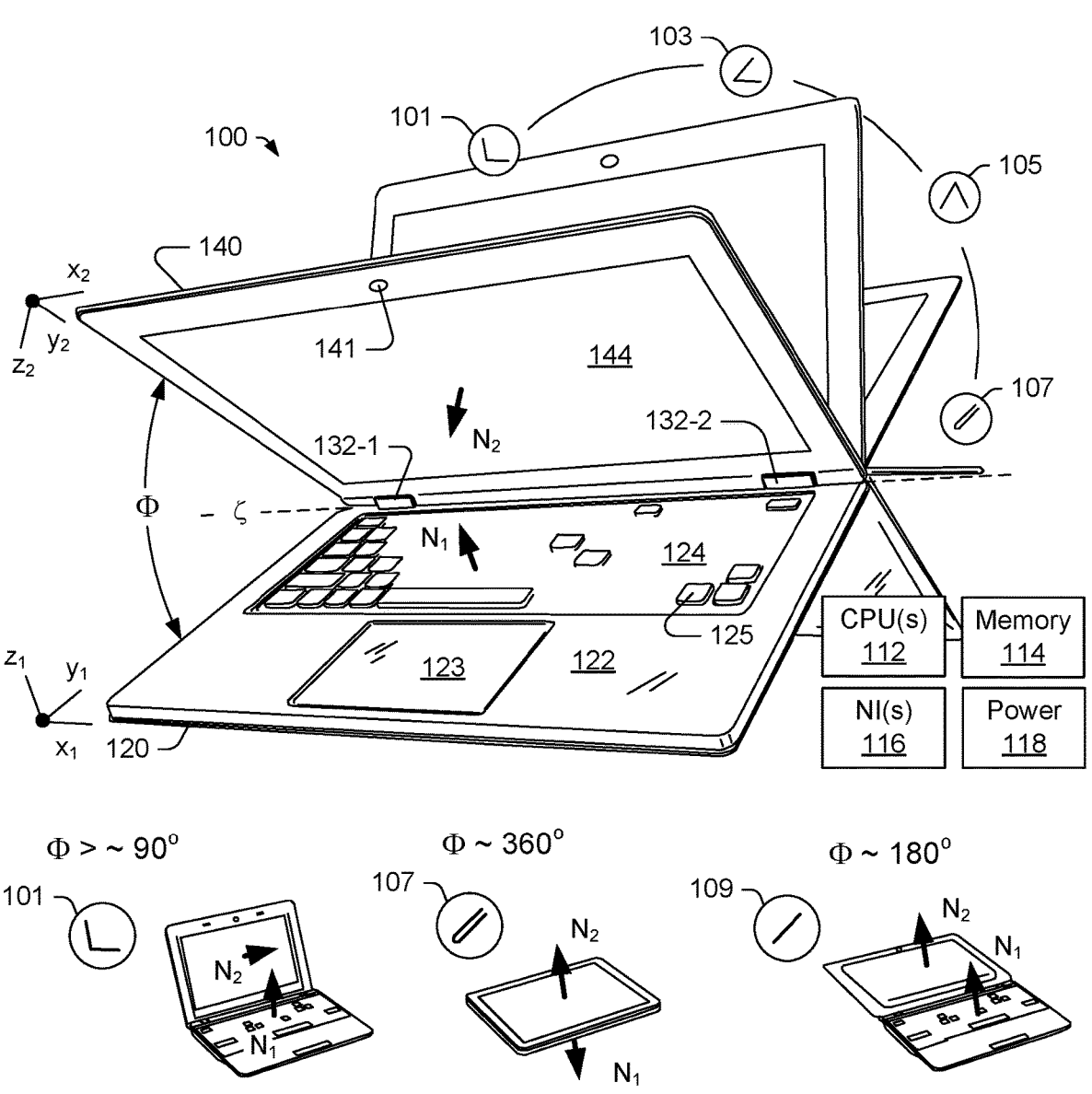
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an unde-pressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user's hand or hands. A user may perceive the springiness of the keys 125 as being somewhat undesirable. For example, springy keys may interfere with a user's ability to compre-hend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
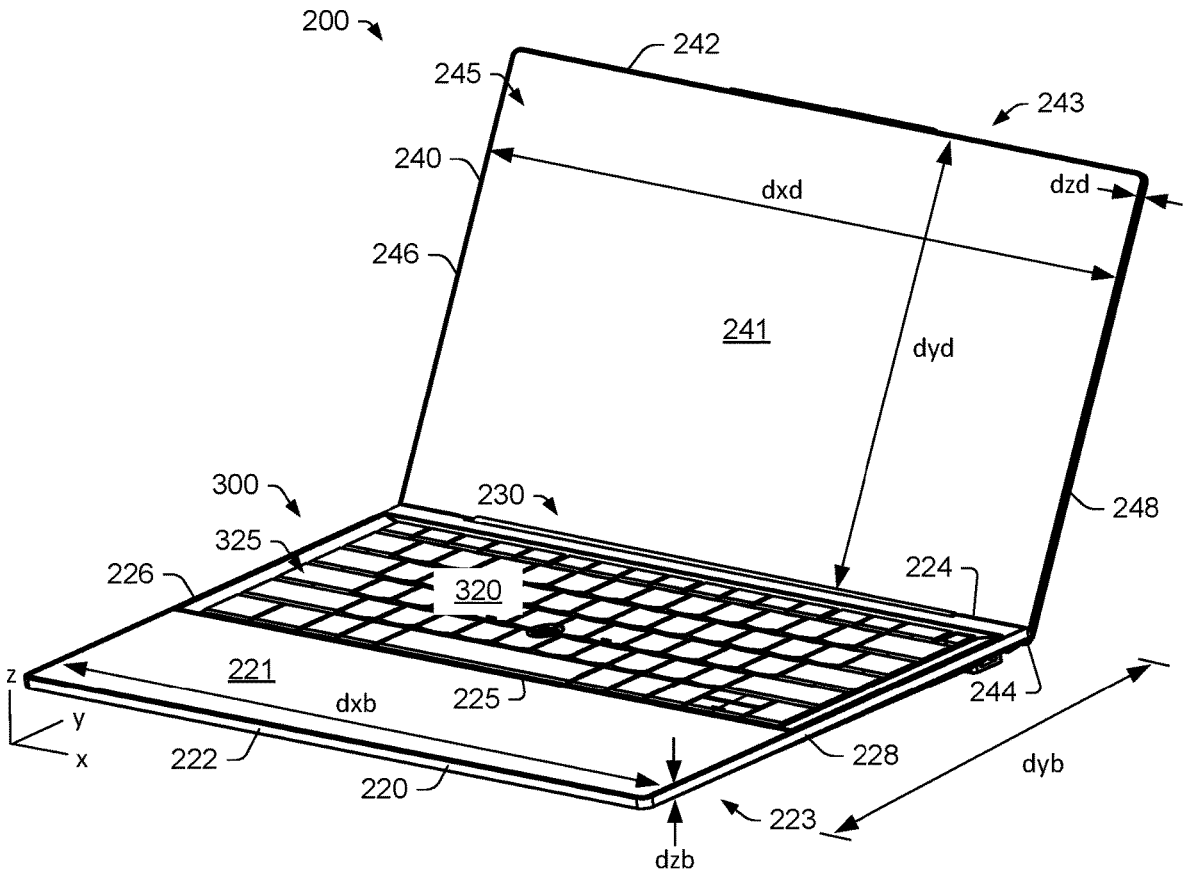
FIG. 2 is a diagram of an example of a computing system.
Figure 3:
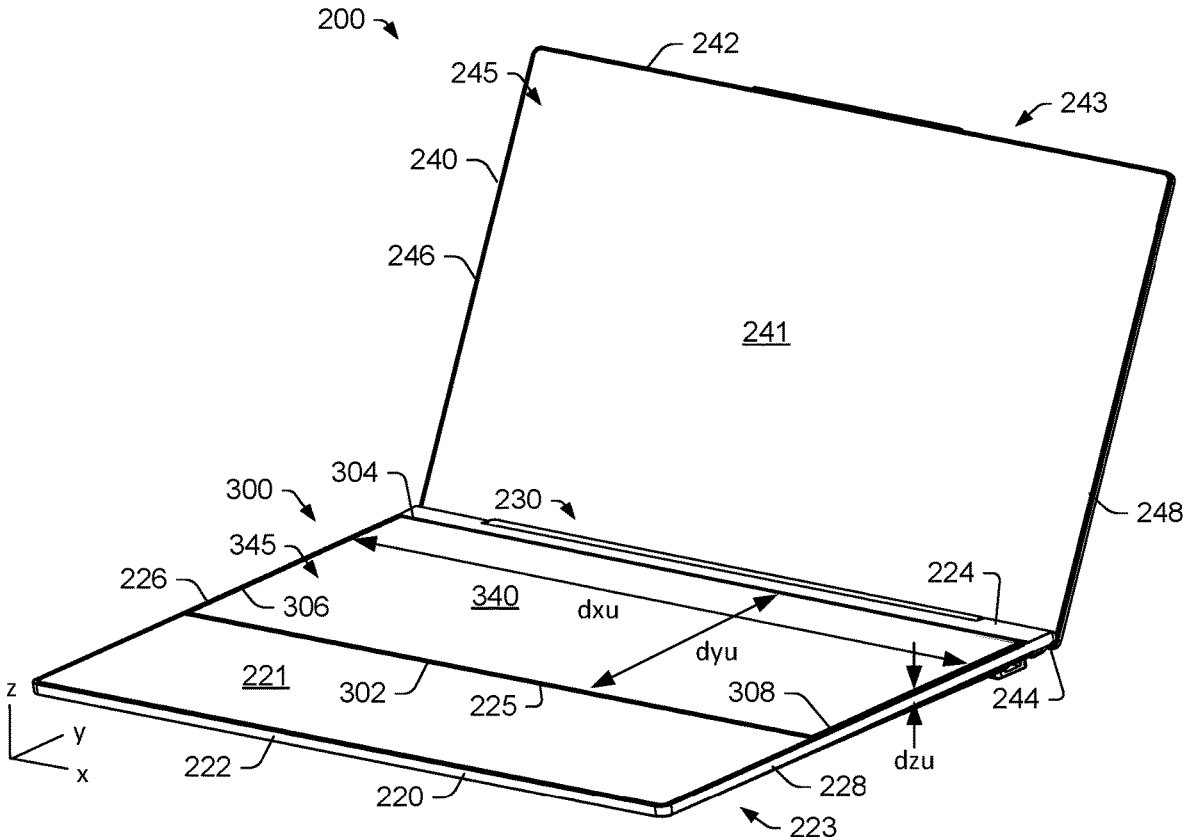
FIG. 3 is a diagram of an example of a computing system.

FIG. 2 and FIG. 3 show an example of a computing system 200 that includes a base housing 220 that includes a base side 223 and an opposing unit recess side 221 that includes a unit recess 225; a display housing 240 that includes a back side 243 and an opposing display side 241 that includes a display 245; a hinge assembly 230 that couples the base housing 220 and the display housing 240; and a unit 300 receivable in the unit recess 225, where the unit can include a physical keyboard side 320 that includes a physical keyboard 325 and an opposing auxiliary display side 340 that includes an auxiliary display 345.

As shown, the base housing 220 can include a fore edge 222, an aft edge 224 (e.g., a hinge side edge), and opposing side edges 226 and 228 (e.g., left and right edges). As shown, the display housing 240 can include a fore edge 242, an eft edge 244 (e.g., a hinge side edge), and opposing side edges 246 and 248 (e.g., left and right edges). In a clamshell configuration, the display housing 240 may open by lifting the fore edge 242 of the display housing 240 away from the fore edge 222 of the base housing 220 where the base housing 220 and the display housing 240 are coupled at or near the aft edges 224 and 244 via the one or more hinge assemblies 230. As an example, an open angle may be defined between the base housing 220 and the display housing 240 via an axis of the one or more hinge assemblies 230 (e.g., noting that a hinge assembly may include one or more axes such as for a dual axle hinge assembly, etc.).

As shown in FIG. 3, the unit 300 can include a fore edge 302, an aft edge 304 (e.g., a hinge side edge), and opposing side edges 306 and 308. As shown, the unit 300 is position-able at least in part in the unit recess 225 for use as a physical keyboard or for use as a display, depending on which side is facing upwardly in the unit recess 225 of the base housing 220.

As an example, the unit 300 may be receivable in the unit recess 225 in one of multiple orientations. As an example, an orientation may correspond to a function of one or more features of the unit 300. For example, consider the display side 340 as being receivable with the fore edge 302 closer to the fore edge 222 of the base housing 220 to provide for one function and as being receivable with the fore edge 302 closer to the aft edge 224 of the base housing 220 to provide for another function. In such an example, detection circuitry may provide for automatic detection of an orientation, whether one or more auxiliary display orientations, one or more keyboard orientations, etc. As an example, consider a first auxiliary display orientation that causes the auxiliary display 345 to function as a touchpad and a second auxiliary display orientation that causes the auxiliary display 345 to function as a display. In such an example, the touchpad orientation may provide for lower power consumption and may operate as a digitizer pad, for example, with an active and/or a passive stylus. As an example, detection circuitry may utilize one or more interfaces, which may be, for example, engaged or otherwise sensitive to an orientation of the unit 300 in the unit recess 225. For example, considered interfaces physically keyed for one or more corresponding functions (e.g., display, touchscreen display, digitizer, touch-pad, e-paper display, etc.).

In the example of FIG. 2 and FIG. 3, one or more features may be described with respect to one or more coordinate systems (see also, e.g., FIG. 1). For example, consider a Cartesian coordinate with x, y and z coordinates as may be defined by coordinate axes (e.g., x-axis, y-axis and z-axis).

As an example, an x-axis may be used to define width, a y-axis may be used to define depth (e.g., a distance orthogonal to and away from a fore edge) and a z-axis may be used to define thickness.

As an example, the base housing 220 may include a width dxb, a depth dyb and a thickness dzb and, for example, the display housing 240 may include a width dxd, a depth dyd and a thickness dzd. As shown, the base housing 220 and the display housing 240 may have substantially similar widths and depths such that when the display housing 240 is in a closed position (e.g., 0 degrees) with respect to the base housing 220, the housings 220 and 240 overlap. As shown in FIG. 3, the unit 300 may include a width dxu, a depth dyu and a thickness dzu.

As an example, a footprint of the computing system 200 may be defined by an extent of the base housing 220 (e.g., width and depth). As an example, various dimensions of features of the computing system 200 may be defined with respect to one or more sides, one or more edges, etc. For example, the width dxb may be defined as a distance between the side edges 226 and 228 of the base housing 220.

Figure 4:
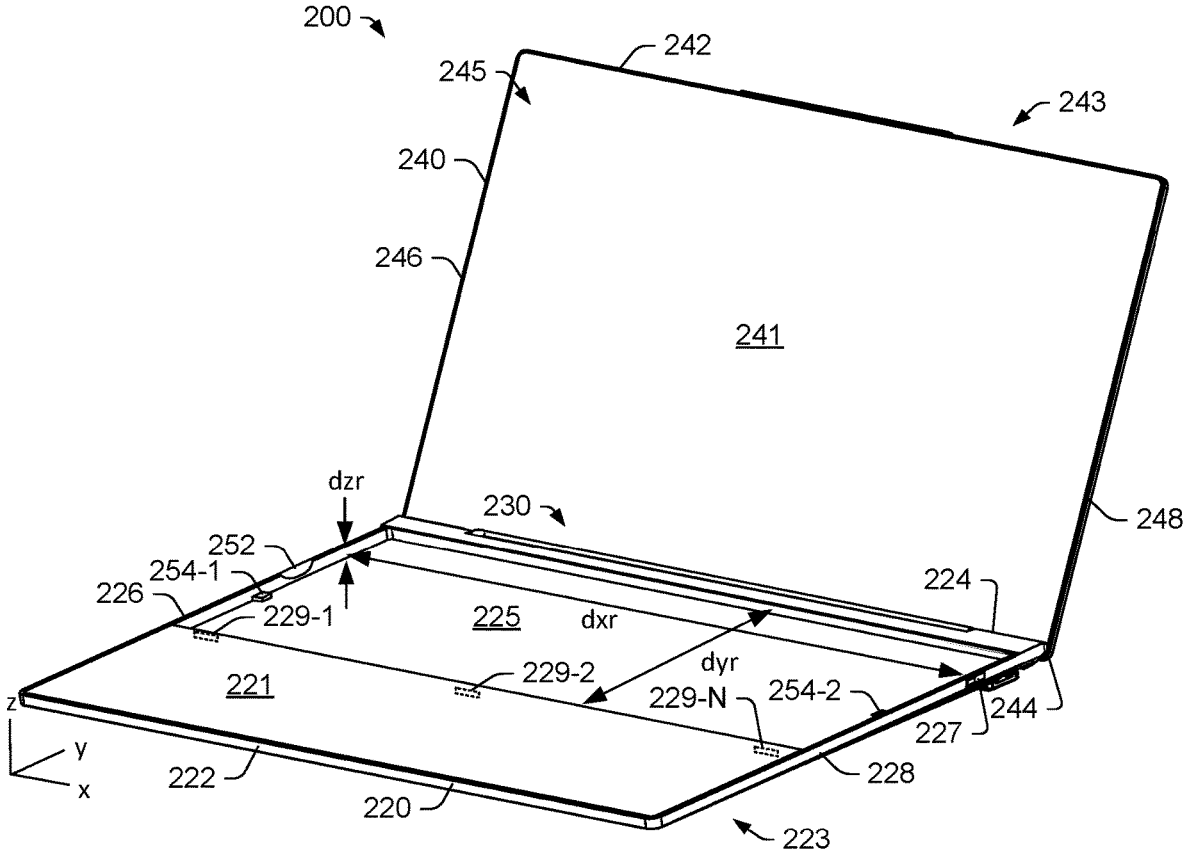
FIG. 4 is a diagram of an example of a computing system.

FIG. 4 shows a perspective view of an example of the computing system 200 without the unit 300 disposed in the unit recess 225. As shown, the unit recess 225 may have an extent (e.g., a footprint) that is less than that of the base housing 220. For example, the unit recess 225 may have a width dxr, a depth dyr and a thickness dzr where dxr is less than or equal to dxb, dyr is less than or equal to dyb and dzr is less than dzb. As an example, an area of the unit recess 225 defined as the product of dxr and dyr may be less than an area of the base housing 220 defined as the product of dxb and dyb.

As an example, various dimensions of the unit 300 can be sized for appropriate receipt in the unit recess 225. For example, the depth dyu of the unit 300 may be approximately the same as the depth dyr of the unit recess 225. As to thickness, the thickness dzu of the unit 300 may be approximately the same as the thickness dzr of the unit recess 225. In such an example, the unit 300 may sit in a relatively flush manner in the unit recess 225 with respect to a surface of the recess side 221 of the base housing 220. In such an example, the unit 300 may not contact the display 245 of the display housing 240 when the display housing 240 is in a closed position with respect to the base housing 220. In such an example, the keyboard 325 of the unit 300 may not touch the display 245 of the display housing 240 such that marks are left on the display 245 (e.g., display surface glass, laminate, plastic, etc.). As an example, a maximum thickness of the unit 300 may be a distance between a display surface of the display 345 and a key of the keyboard 325. As explained, the keyboard 325 may include physical keys, which may be depressible and spring loaded. As an example, the unit 300 may sit in the unit recess 225 with the display 345 facing upwardly while keys of the keyboard 325 are not in a depressed state.

In the example of FIG. 4, the base housing 220 is shown as including a latch 227, which may be utilized to secure the unit 300 in the unit recess 225. For example, consider a mechanical and/or a magnetic latch where the latch 227 may be finger operated and where the latch 227 may automatically be actuated to secure the unit 300 once the unit 300 is received in the unit recess 225 (e.g., consider a spring loaded latch that automatically latches). As an example, the base housing 220 may include a finger access recess 252 that can facilitate removal of the unit 300 from the unit recess 225. As an example, the base housing 220 may include one or more finger access features and/or one or more latches.

As an example, the unit 300 and/or the unit recess 225 may include one or more stop surfaces that may be asymmetric in that the display side 340 can sit deeper in the unit recess 225 than the keyboard side 320 such that keys of the keyboard 325 can be in an undepressed state (e.g., unstressed), which may help to maintain integrity of the keyboard 325 when seated and not being used. For example, consider one or more extended surfaces 254-1 and 254-2 in the unit recess 225 that can be seated in one or more corresponding recesses of the unit 300 when the display side 340 is down (e.g., one or more key and keyway pairs); whereas, when the display side 340 is up, the one or more extended surfaces (e.g., a key or keys) can contact a surface or surfaces of the unit 300 (e.g., a perimeter, a bezel, a space between keys, etc.) to prevent it from being seated further downwardly to thereby provide a protective distance for keys of the keyboard 325 to be in an undepressed state. In such an example, a perimeter of the unit 300 may include one or more notches (e.g., keyways) that can receive the one or more extended surfaces (e.g., keys) where, for example, such features are configured to receive the unit 300 in one or more orientations (e.g., with the display side down).

As explained, the unit 300 can include an auxiliary display side 340 that includes an auxiliary display 345. In such an example, the auxiliary display 345 may have an area that is less than an area of the display 245 of the display housing 240. As an example, the auxiliary display 345 may have an aspect ratio that is the same or different than an aspect ratio of the display 245. In the example of FIG. 3, the aspect ratio of the auxiliary display 345 is defined by a width that is greater than a depth. As an example, the auxiliary display 345 may have an aspect ratio that corresponds to one or more standard aspect ratios for displays. In such an example, the computing system 200 may include multiple display circuitry that can set a first aspect ratio for the display 245 and a second aspect ratio for the auxiliary display 345, which may differ from the first aspect ratio. As an example, one or more applications may include features for rendering of graphics, content, etc., to one or more displays. In such an example, consider the auxiliary display 345 as being utilized to render one or more menu graphics while the display 245 may be utilized to render content that may be controlled, edited, adjusted, etc., using one or more selectable menu items of the menu graphics.

In the example of FIG. 4, the base housing 220 is shown as including one or more interfaces 229-1, 229-2, . . . , 229-N, which may be positioned at a surface or surfaces of walls that form the unit recess 225. For example, the unit recess 225 may include a base wall (e.g., a floor), a fore wall, an opposing aft wall and opposing side walls.

As an example, an interface may be symmetric or asymmetric with respect to a unit recess and/or a unit. For example, if an interface is centered, it may be suitable for use as an interface for keyboard functionality of the keyboard 325 of the unit 300 and for use as an interface for display functionality of the display 345 of the unit 300. As to a non-centered interface or other type of asymmetric interface, it may be utilized in one orientation of the unit 300 in the unit recess 225 and not in another orientation of the unit 300 in the unit recess 225. For example, in FIG. 4, the interfaces 229-1 and 229-N may be asymmetric interfaces where one of the interfaces mates with an interface of the unit 300 in one orientation (e.g., keyboard orientation) and the other one of the interfaces mates with the interface of the unit 300 in another orientation (e.g., display orientation). In such an example, one of the interfaces may be configured for detection and use of the unit 300 as a keyboard (e.g., via the keyboard 325) and the other one of the interfaces may be configured for detection and use of the unit 300 as a display (e.g., via the auxiliary display 345).

As explained, while the one or more interfaces 229-1, 229-2, . . . , 229-N are shown in the example of FIG. 4, on a fore wall of the unit recess 225, one or more interfaces may be on the same or another wall of the unit recess.

Figure 5:
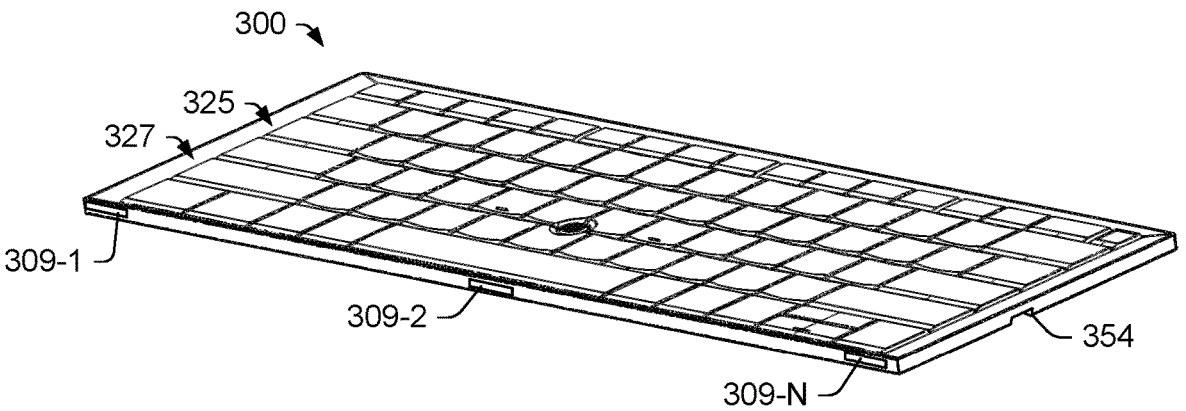
FIG. 5 is a diagram of an example of a unit.

FIG. 5 shows an example of the unit 300 with the keyboard 325 facing upwardly where the unit 300 includes one or more interfaces 309-1, 309-2, . . . , 309-N; noting that one or more interfaces may be positioned on another side of the unit 300, additionally or alternatively. In the example of FIG. 5, the unit 300 may include a bezel surface 327, which may be a region adjacent to a key region of the keyboard 325 where the bezel surface 327 may be present along one or more of the edges 302, 304, 306 and 308 of the unit 300, for example, along at least a portion of a perimeter of the unit 300. As shown in the example of FIG. 5, the interface 309-1 may be a display interface and the interface 309-N may be a keyboard interface where each of these two interfaces may mate with a common interface of the unit recess 225. For example, consider the interface 209-N of the unit recess 225 as being a common interface such that the interface 309-N can mate with the interface 209-N and, for example, by flipping the unit 300 over the interface 309-1 can mate with the interface 209-N. As explained, a centered interface may be utilized (e.g., consider the interfaces 209-2 and 309-2 as being suitable for mating for a keyboard orientation and for a display orientation of the unit 300 in the unit recess 225). As an example, multiple interfaces of a unit and/or a unit recess may be utilized, for example, as to one or more of power and data transmission/receipt.

As an example, the base housing 220 may include one or more magnets and/or ferromagnetic materials. For example, consider one or more magnets and/or ferromagnetic materials at one or more of the positions of the one or more interfaces 229-1, 229-2, . . . , 229-N and/or at one or more other positions. In such an example, the unit 300 may include one or more magnets and/or ferromagnetic materials at one or more of the positions of the one or more interfaces 309-1, 309-2, . . . , 309-N and/or at one or more other positions. Given such features, a magnetic attraction force may be utilized to secure the unit 300 in the unit recess 225 of the base housing 220. As an example, a magnetic attraction force may facilitate mating of interfaces such that force applied to the unit 300 does not result in a mating instability. For example, consider a user touch-typing using the keyboard 325, touching the display 345, etc., with some amount of force.

As explained, the unit 300 may include one or more notches. For example, in FIG. 5, a notch 354 is shown, which may be on a perimeter, a bezel, etc., of the unit 300, where the notch 354 may be a keyway that can receive a key, which may be one of the one or more extended surfaces 254-1 and 254-2 of the base housing 220. As an example, another notch may be located on an opposing side of the unit 300 (e.g., consider notches for extended surfaces 254-1 and 254-2. As explained, in such an example, keys of the keyboard 325 may be disposed at a level when the unit 300 is seated in the unit recess 225 such that the keys do not contact a surface of the display 245 of the display housing 240 when the display housing 240 is in a closed position with respect to the base housing 220 (e.g., a closed clamshell). Further, in such an example, when the display 345 of the unit 300 is facing upwardly, the keys of the keyboard 325 may be in a non-depressed position as the one or more extended surfaces 254-1 and 254-2 can provide for support of the unit 300 along a perimeter, a bezel, etc. For example, contact may occur between the one or more of the extended surfaces 254-1 and 254-2 and the bezel surface 327. By providing for positioning of the unit 300 with the keyboard 325 facing downwardly without depression of keys of the keyboard 325, the longevity of the keys of the keyboard 325 may be extended (e.g., consider maintaining springs of spring loaded keys in an extended state rather than a compressed state which may place more stress on the springs). In various examples, one or more interfaces may provide for appropriate mating whether the keyboard 325 is facing upwardly for use or the display 345 is facing upwardly for use. As an example, use of a key-keyway approach can effectively help to maintain a thickness of the unit 300 in the unit recess 225 such that tops of keys of the keyboard 325 are substantially flush with the surface of the recess side 221 of the base housing 220 when the keyboard 325 is facing up and such that the surface of the display side 340 is substantially flush with the surface of the recess side 221 of the base housing 220 when the display 345 is facing up.

Figure 6:
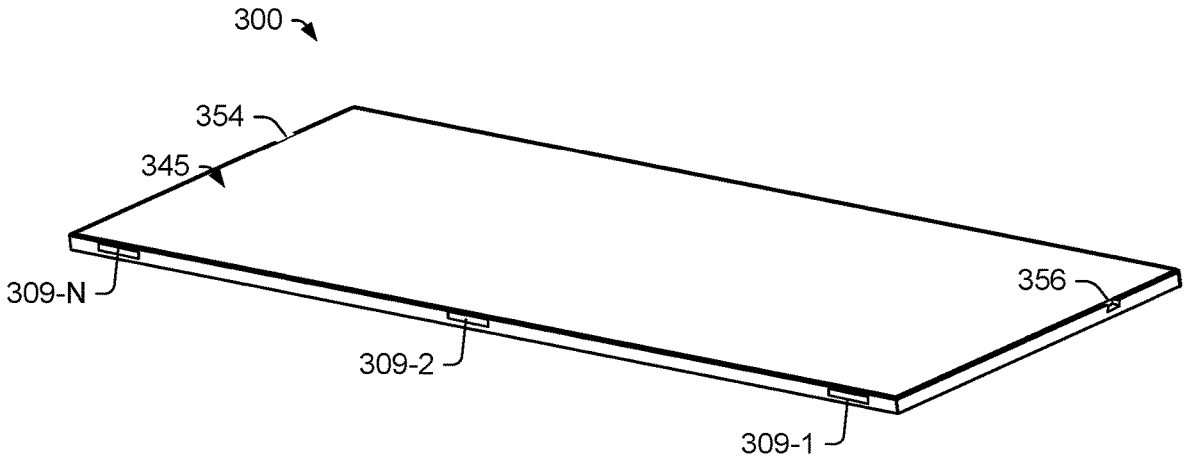
FIG. 6 is a diagram of an example of a unit.

FIG. 6 shows an example of the unit 300 with the auxiliary display 345 facing upwardly where the unit 300 includes the one or more interfaces 309-1, 309-2, . . . , 309-N. As explained, the unit 300 and/or the unit recess 225 of the base housing 220 may include one or more interfaces that may be symmetric or asymmetric, noting that a combination of symmetric and asymmetric interfaces may be included. In the example of FIG. 6, the notch 354 is shown, noting that the unit 300 may include another notch 356, which, as explained, may act as keyways for the extended surfaces 254-1 and 254-2 that may act as keys. As an example, a unit and a recess may include one or more key and keyway pairs, which may, for example, be associated with and/or act as one or more interfaces. For example, a key may include one or more electrical contacts and a keyway may include one or more electrical contacts. In such an example, the contacts may mate to provide for transmission of one or more of power and data. As an example, mating of interfaces may provide for detection of an orientation of a unit in a unit recess of a base housing.

Figure 7:
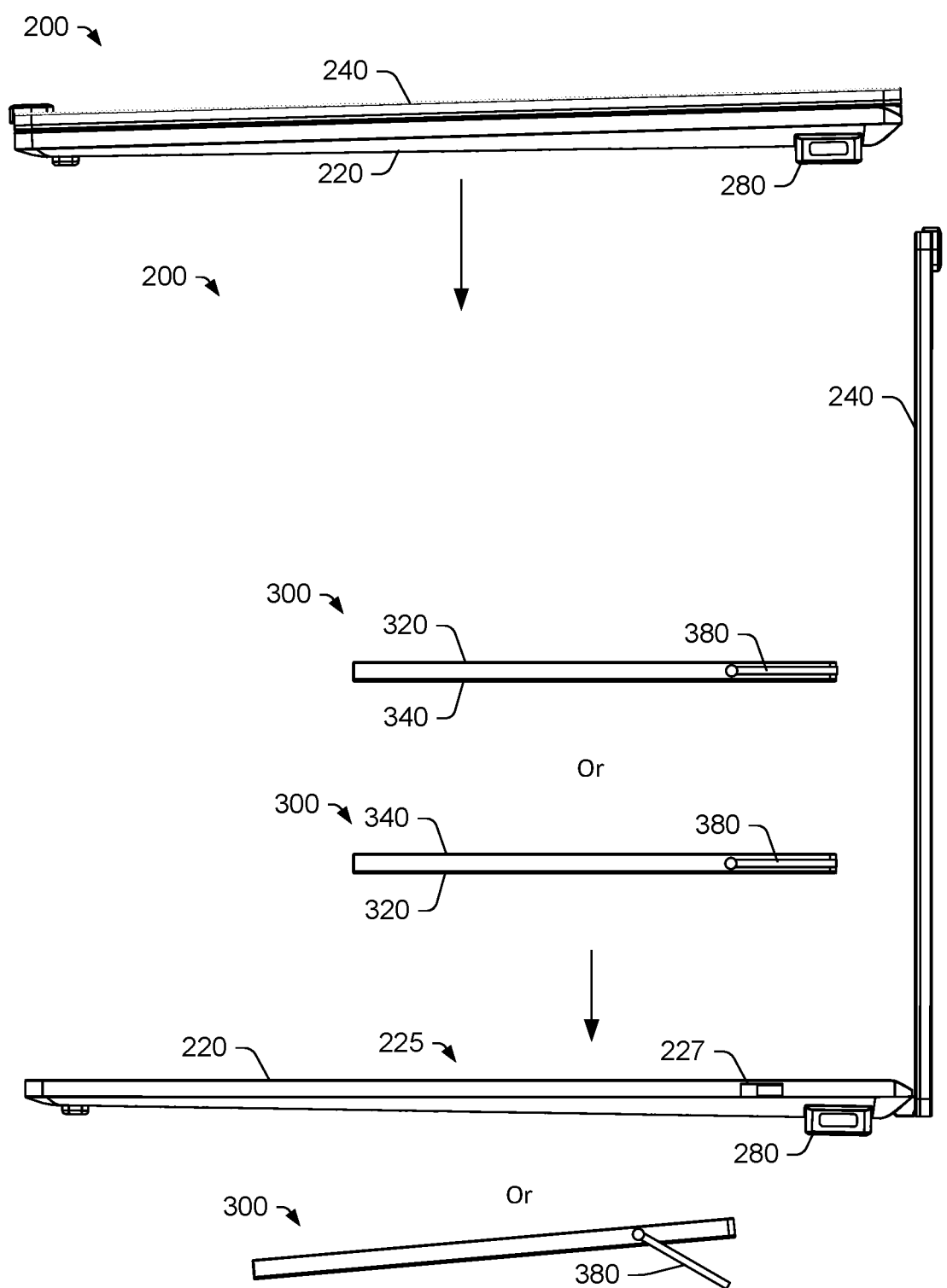
FIG. 7 is a series of diagrams of an example of a computing system.

FIG. 7 shows an example of the computing system 200 in a closed position and in an open position where, for example, the base housing 220 includes the latch 227 that can releasably secure the unit 300 in the unit recess 225 of the base housing 220. As shown, the computing system 200 may be transitioned from the closed position to the open position and the unit 300 may be oriented in one of multiple orientations for receipt of the unit 300 in the unit recess 225 of the base housing 220 of the computing system 200. As an example, the latch 227 may be a hand actuatable latch, which may be a tool-less latch that may be at least released by use of a finger of a user's hand. As explained, a computing system may include circuitry that can provide for detection of an orientation of a unit in a unit recess, which may provide for configuring the computing system for use of the unit (e.g., one or more functionalities of the unit). As shown, the base housing 220 may also include one or more ports 280, which may be, for example, a serial port (e.g., USB type of port). As an example, one or more of power and data may be transmitted via the one or more ports 280. As an example, the one or more ports 280 of the base housing 220 may be electrically coupled to one or more interfaces of the unit recess 225 (e.g., directly and/or indirectly). As an example, the one or more ports 280 may be provided on an end of a bar or foot portion of the base housing 220, which may provide for making one or more other portions of the base housing 220 thinner.

In the example of FIG. 7, the unit 300 is shown as including a stand 380, which may include components on two opposing sides and/or a U-shaped component that extends from one side to another while traversing an intermediate side. As an example, the stand 380 may be deployable to support the unit 300 on a support surface (e.g., a tabletop, a desktop, a countertop, etc.) with the keyboard side 320 facing up or with the auxiliary display side 340 facing up. As an example, the stand 380 may be configured to fit within a perimeter space of the unit 300 such that it may be substantially flush with a perimeter of the unit 300. For example, the unit 300 may include a U-shaped recess that can seat a U-shaped member of the stand 380. As an example, where the stand 380 includes a U-shaped member, it may also be utilized as a handle for carrying the unit 380. For example, consider a user's hand being inserted into a space between the U-shaped member and one of the keyboard side 320 or the auxiliary display side 340.

Figure 8:
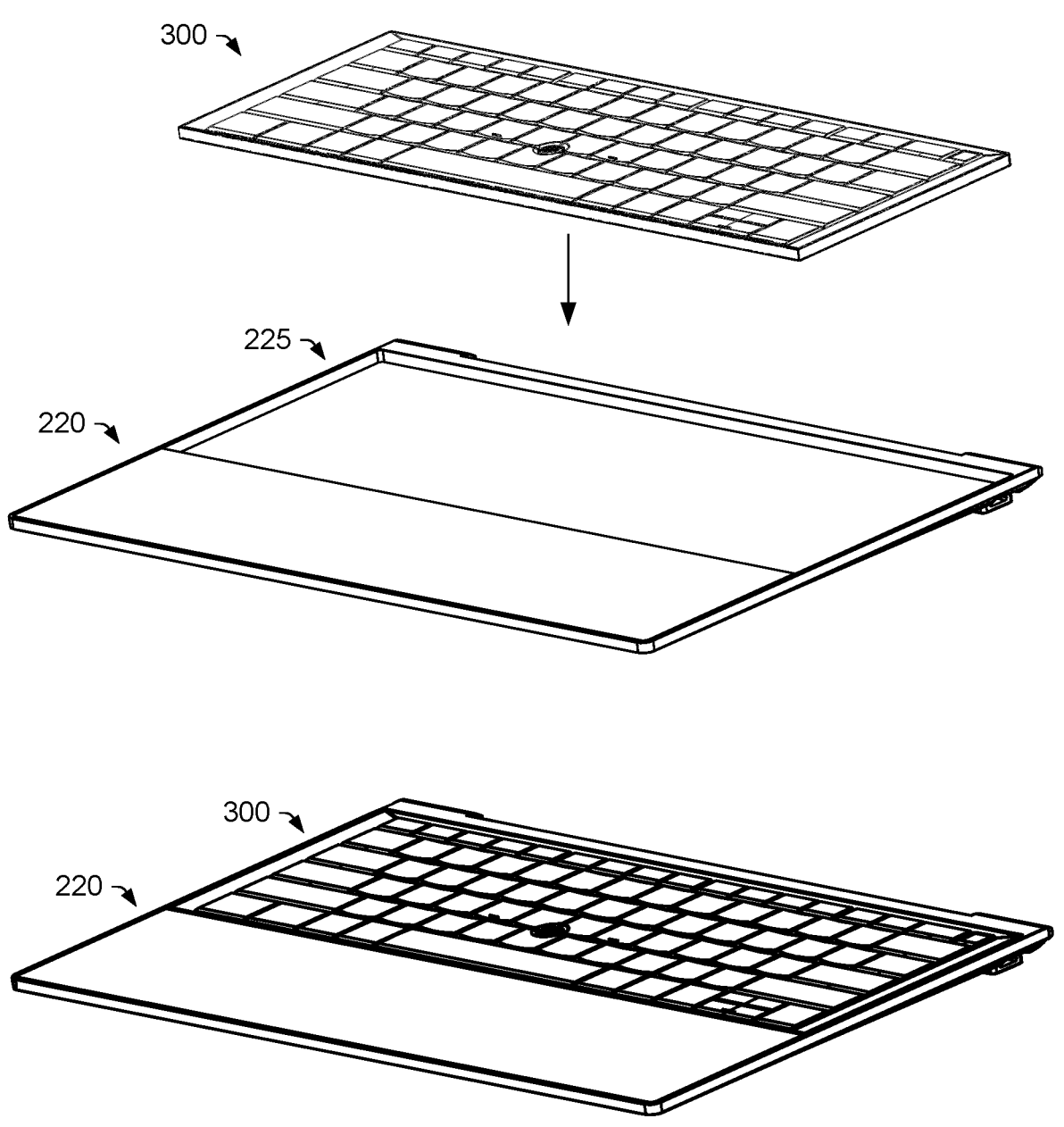
FIG. 8 is a diagram of an example of a method.

FIG. 8 shows an example of a method where the unit 300 can be received in the unit recess 225 of the base unit 220 to form an assembly where the unit 300 may be utilized as a keyboard. For example, a user may position the unit 300 in the unit recess 225 and then utilize the unit 300 where, for example, detection circuitry may detect an orientation of the unit 300 to thereby make the unit 300 suitable for user.

Figure 9:
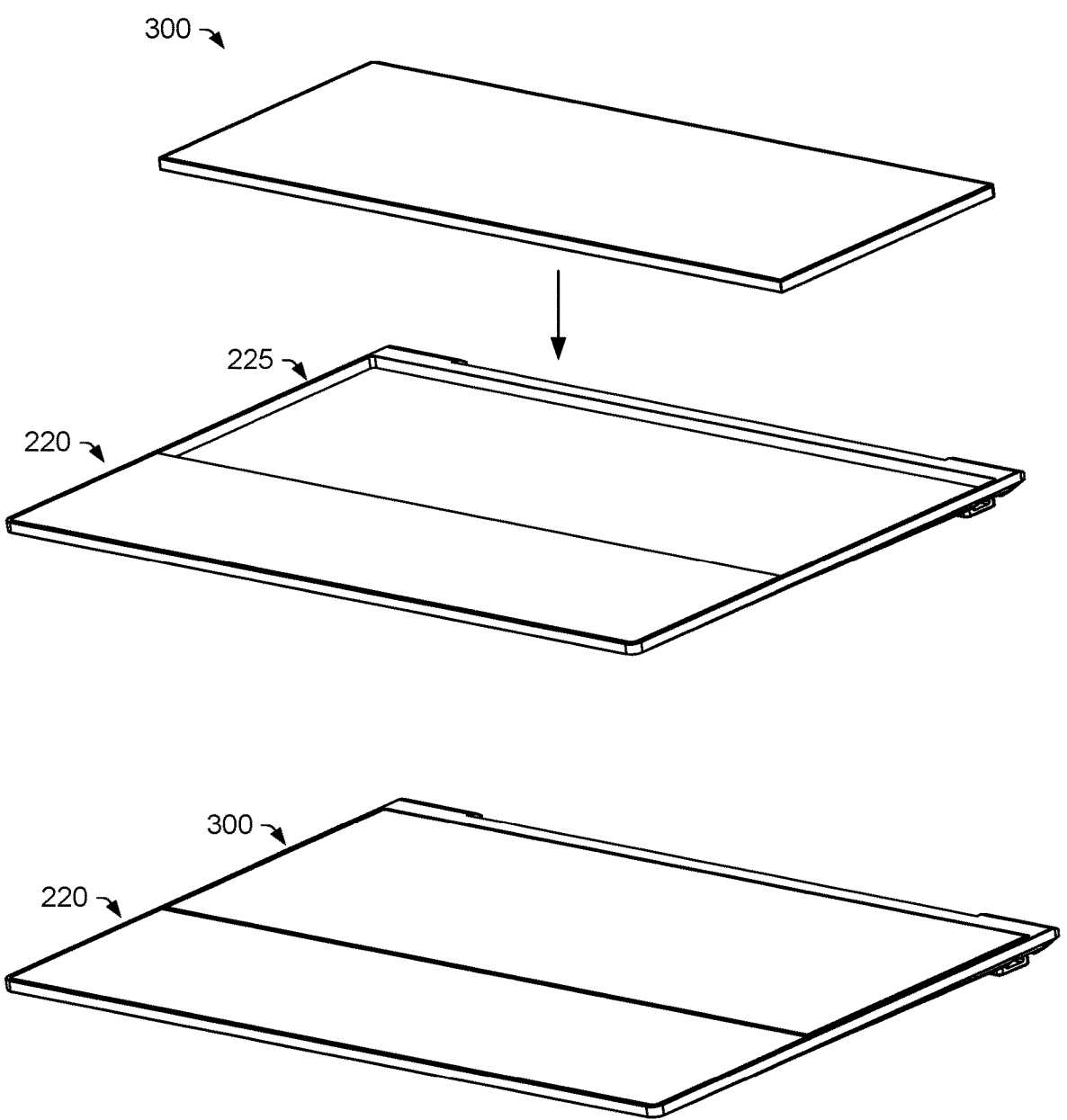
FIG. 9 is a diagram of an example of a method.

FIG. 9 shows an example of a method where the unit 300 can be received in the unit recess 225 of the base unit 220 to form an assembly where the unit 300 may be utilized as a display (e.g., an auxiliary display). For example, a user may position the unit 300 in the unit recess 225 and then utilize the unit 300 where, for example, detection circuitry may detect an orientation of the unit 300 to thereby make the unit 300 suitable for user.

Figure 10:
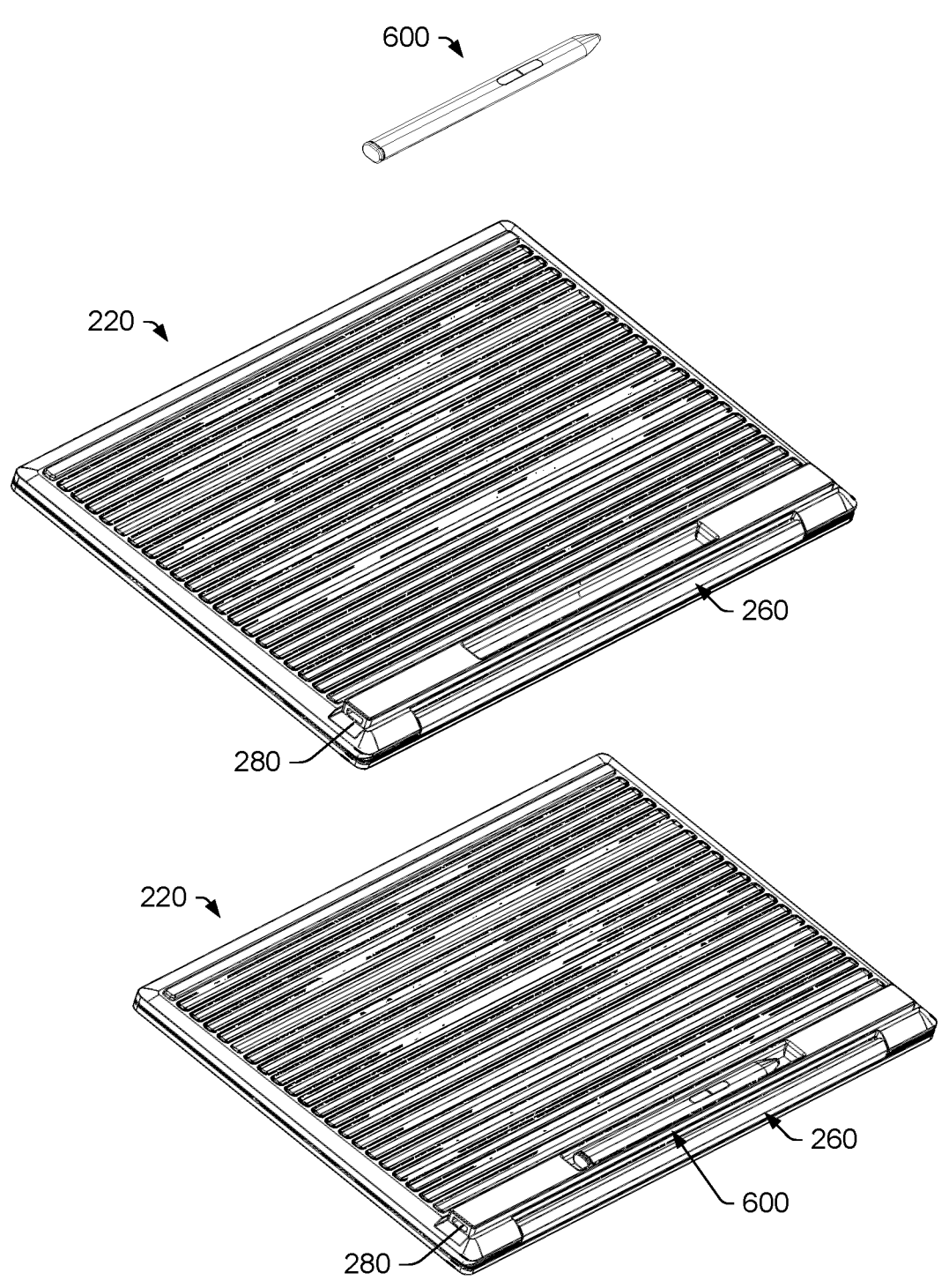
FIG. 10 is a diagram of an example of a method.

FIG. 10 shows an example of a method where the base unit 220 includes a stylus recess 260 for receipt of a stylus 600. For example, the stylus 600 may be inserted at least in part into the stylus recess 260 for purposes of storage, charging, etc. As explained, the unit 300 may include circuitry that provides for use of a stylus, for example, with a touchpad, a digitizer pad, etc. As an example, one or more displays of the computing system 200 may include associated circuitry that can be utilized with a stylus, for example, for input to draw, select an object, select a menu item, etc. As an example, a stylus may include one or more power storage circuits that can be charged wirelessly and/or in a wired manner. As an example, the base housing 220 of the computing system 200 may include one or more types of charging circuitry that can charge a stylus. As an example, the stylus 600 may be secured in the stylus recess 260 via a magnetic attraction force, for example, as supplied via one or more magnets.

FIG. 11 shows a block diagram of a unit 1100 of various examples of features of the unit 1100, which may be a unit such as the unit 300. As shown, the unit 1100 may include one or more of a keyboard 1110, a display 1120 (e.g., an auxiliary display), one or more other human input devices 1130, one or more processors 1140, memory 1150, one or more interfaces 1160, audio circuitry 1170, power circuitry 1180 (e.g., one or more batteries, one or more types of charging circuitry, etc.), and one or more other types of features 1190 (e.g., orientation circuitry (e.g., gyroscope, accelerometer, gravity direction sensor, etc.), physical features, circuitry, magnetic and/or ferromagnetic material, etc.). As an example, a unit may include one or more types of circuitry, which, as mentioned, may include LED circuitry, e-paper circuitry, touch sensing circuitry, digitizer circuitry, keyboard circuitry, etc. As an example, a unit may include one or more navigation features such as, for example, a TRACKPOINT feature that may include nub positioned within a keyboard region that can be utilized for input, moving a cursor, etc.

As an example, the unit 1100 and/or the unit 300 can include a stand that may provide for positioning on a support surface. For example, consider a kickstand that may be oriented in one or more directions to support a unit on a support surface for use as a keyboard and/or as a display.

As an example, the computing device 200 can include one or more types of charging circuitry where, for example, the unit 300 may be charged via wired and/or wireless technology. As an example, the unit 300 may include one or more of wired and/or wireless technology for power and/or data. As an example, the unit 300 may be usable when not seated in a unit recess such as the unit recess 225 of the base housing 220. For example, a user may remove the unit 300 from the unit recess 225 and utilize the unit 300 as a display device, a keyboard device, etc. As an example, the unit 300 may be operable in an independent manner and/or a dependent manner, for example, being operatively coupled to a computing system, a computing device, etc., via wired and/or wireless technology. As an example, the unit 300 may be configured to mirror content rendered to the display 245 of the display housing 240 and/or to provide one or more user interfaces for control of content rendered to the display 245 of the display housing 240 (e.g., consider control of video, a slideshow, etc.).

Figure 12:
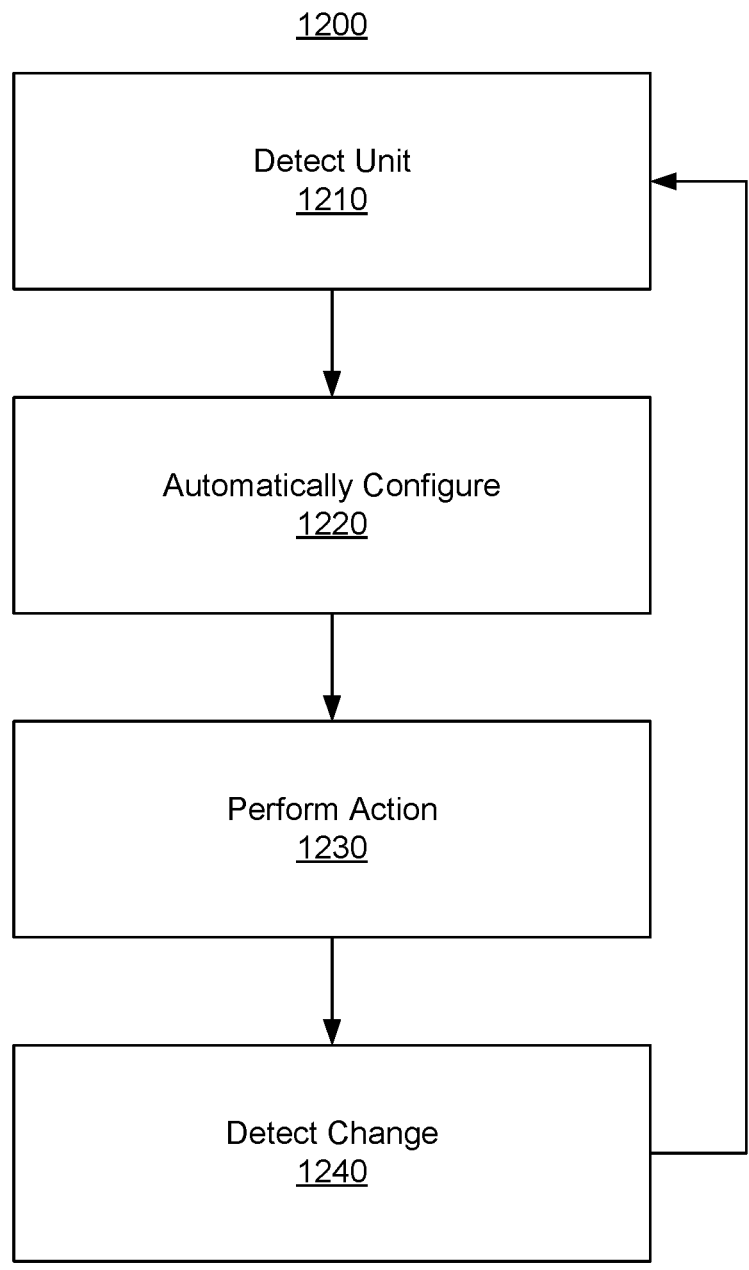
FIG. 12 is a diagram of an example of a method.

FIG. 12 shows an example of a method 1200 that can include a detection block 1210 for detecting a unit in a unit recess of a housing, a configuration block 1220 for automatically configuring circuitry of the housing, a performance block 1230 for performing one or more actions using the unit in the unit recess of the housing, and a detection block 1240 for detecting a change to the unit with respect to the unit recess of the housing. For example, consider a user removing the unit from the unit recess of the housing and re-orienting the unit and positioning the unit in the unit recess of the housing in the re-oriented position. In such an example, a first orientation may be a keyboard orientation and a second orientation may be a display orientation; noting that one or more other orientations may be possible (e.g., touchpad, digitizer, etc.). As explained, detection circuitry may provide for detection of presence and/or detection of orientation where, for example, orientation may provide for determining function of a unit.

As an example, a unit can include different sides that correspond to different functionalities. For example, consider a display side and a keyboard side. In such an example, a user may select a side of the unit for use where a circuitry of a housing or housings of a computing device or system may be configured or configurable for such a use.

As an example, a readily removable keyboard may provide for ease of servicing of a computing system and/or the keyboard. As an example, a readily removable keyboard may provide for enhanced flexibility of a clamshell type of computing system. For example, a user may sit a base housing on a support surface and remove the keyboard as a unit for use on that support surface and/or on another support surface (e.g., lap, etc.).

As an example, a display may include one or more types of display circuitry, which may be LED-based (e.g., OLED, etc.) or based on one or more other technologies. As explained, a display may include touch sensing circuitry, which may include digitizer circuitry (e.g., operable using a stylus, etc.). As an example, a display may include electronic paper (e.g., e-paper) type of display circuitry.

As an example, a computing system can include a top loading keyboard that is relatively easy to remove for serviceability, remote use, etc., that can be flipped over to provide a display, which may be loaded back into a housing to create a dual display experience for notetaking, sketching, digital keyboard input, etc., and/or utilized remotely (e.g., as a mobile display device, etc.). As explained, a user can choose to flip a unit to a keyboard side or a display side where, for example, the display side may be a multiple orientation and/or multiple functionality display side (e.g., for use as a display, a touchpad, a digitizer pad, a hand rest, etc.). As an example, a keyboard side of a unit may have a single orientation in a unit recess while a display side of the unit may have one or more orientations in a unit recess. As an example, a display side of a unit may have multiple orientations in a unit recess where each of the orientations provides for at least one function where, for example, functions may differ depending on orientation.

As an example, a computing system can include a base housing that includes a base side and an opposing unit recess side that includes a unit recess; a display housing that includes a back side and an opposing display side that includes a display; a hinge assembly that couples the base housing and the display housing; and a unit receivable in the unit recess, where the unit includes a physical keyboard side that includes a physical keyboard and an opposing auxiliary display side that includes an auxiliary display. In such an example, the unit recess can be a substantially rectangular opening and where the unit includes a substantially rectangular perimeter. As an example, a unit recess may include one or more curved corners and/or a unit may include one or more curved corners. For example, consider radiused corners along with straight edges where, for example, the straight edges may extend along at least 80 percent of an edge distance (e.g., consider up to 99.5 percent for a curved corner).

As an example, a base housing can include an interface and a unit can include a mating interface. In such an example, the mating interface may be centered along an edge of the unit.

As an example, a base housing can include an interface and a unit can include a first mating interface for a physical keyboard of the unit and a second mating interface for an auxiliary display of the unit.

As an example, a computing system can include a latch that releasably secures a unit in a unit recess of a base housing of the computing system.

As an example, an auxiliary display of a unit may include touch sensing circuitry. In such an example, the touch sensing circuitry may be operable in combination with display circuitry or, for example, it may be operable without operation of the display circuitry, which may provide for a lower power mode of operation where, for example, the touch sensing circuitry may be utilized as a touchpad, a digitizer pad, etc.

As an example, a computing system can include detection circuitry that automatically detects an orientation of a unit in a unit recess of a base housing of the computing system. In such an example, the computing system can include a processor that selectively receives instructions from a physical keyboard or transmits instructions to an auxiliary display responsive to detection of an orientation of the unit in the unit recess by the detection circuitry. In such an example, the processor may execute an application to render information to the display and to render information to the auxiliary display simultaneously. In such an example, the information rendered to the auxiliary display may include at least one navigation graphic. As an example, information rendered to an auxiliary display may include a graphical keyboard. In such an example, a unit may include a physical keyboard and a display that can render a graphical keyboard. In such an example, a user may have the option of orienting the unit in a unit recess to utilize one of the physical keyboard and the graphical keyboard.

As an example, a unit may seat completely within a unit recess of a base housing of a computing system. In such an example, in a closed position of a display housing of the computing system with respect to the base housing, neither the physical keyboard nor an auxiliary display side contact a display of the display housing. In such an approach, the display of the display housing may be protected from contact that may cause damage, markings, etc. (e.g., due to vibration, force, etc.).

As an example, a computing system can include wireless communication circuitry that operatively couples circuitry of a unit to circuitry of a base housing and/or circuitry of a display housing. In such an example, the circuitry of the unit may be operatively couplable to the circuitry of the base housing and/or the display housing without the unit seated in the unit recess. For example, the unit may be operable as a mobile unit optionally with or without communication with circuitry of the base housing and/or the display housing. As explained, a unit may be a relatively lightweight device with its own power source (e.g., battery), a processor and memory where, for example, it may be utilized as a media device, a keyboard device, etc. As explained, the unit may include e-paper circuitry such that, for example, it may operate as a reader device for text, etc. As an example, a unit may include drawing circuitry such that notes, scribbles, drawings, etc., may be input via a display side where, for example, touching using a finger and/or a stylus may be utilized for generating input and renderings.

As an example, a unit can include a stand for positioning the unit on a surface. As explained, such a stand may include one or more features such as, for example, a U-shaped member that may provide for deployment in one or more directions to support the unit in one or more orientations (e.g., auxiliary display side up or keyboard side up).

As an example, a computing system may include two or more units, which may be differently configured and selected for receipt in a unit recess.

As an example, a computing system may include a unit recess of a base housing that includes one or more extended surfaces and a unit that includes one or more notches for receipt of the one or more extended surfaces via an auxiliary display side of the unit. In such an example, keys of a keyboard side of the unit may be positioned lower in a unit recess than without such features. For example, the tops of the keys may be positioned substantially flush with a surface of a base housing or slightly lower such that in a closed position of the base housing and a display housing of the computing system the tops of the keys do not contact a surface of a display of the display housing. In such an example, when the keyboard side is oriented to face down in the unit recess, upon positioning the unit in the unit recess, keys of a keyboard of the keyboard side may be in an uncompressed (e.g., undepressed) state, which may help to maintain integrity of the keys. Such an approach may also provide for making an auxiliary display side of the unit more stable rather than "springy" when the auxiliary display side is facing up. For example, when the keyboard side is facing down, if the keys are depressible, they auxiliary display side may move upon application force. Whereas, if the keyboard side is supported in a manner that does not allow for depression of the keys, the auxiliary display side will be more stable if a user touches it with a finger and/or a stylus.

As an example, a method can include, in a computing system including a base housing that includes a base side and an opposing unit recess side that includes a unit recess, a display housing that includes a back side and an opposing display side that includes a display, a hinge assembly that couples the base housing and the display housing, and a unit receivable in the unit recess, where the unit includes a physical keyboard side that includes a physical keyboard and an opposing auxiliary display side that includes an auxiliary display, automatically detecting an orientation of the unit; and configuring the computing system responsive to the detecting. As an example, a method may provide for detection of orientation even if the unit is used outside of a unit recess, for example, as a portable display and/or a portable keyboard. For example, the unit may include one or more types of orientation circuitry, which may include, for example, one or more of gyroscopes, accelerometers, gravity direction sensors, ambient light sensors, etc.

As an example, one or more non-transitory computer-readable media may include processor-executable instructions to instruct a computing system to: automatically detect an orientation of a unit in a computing system including a base housing that includes a base side and an opposing unit recess side that includes a unit recess, a display housing that includes a back side and an opposing display side that includes a display, and a hinge assembly that couples the base housing and the display housing, where the unit is receivable in the unit recess and includes a physical keyboard side that includes a physical keyboard and an opposing auxiliary display side that includes an auxiliary display; and configure the computing system responsive to the detecting.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 13:
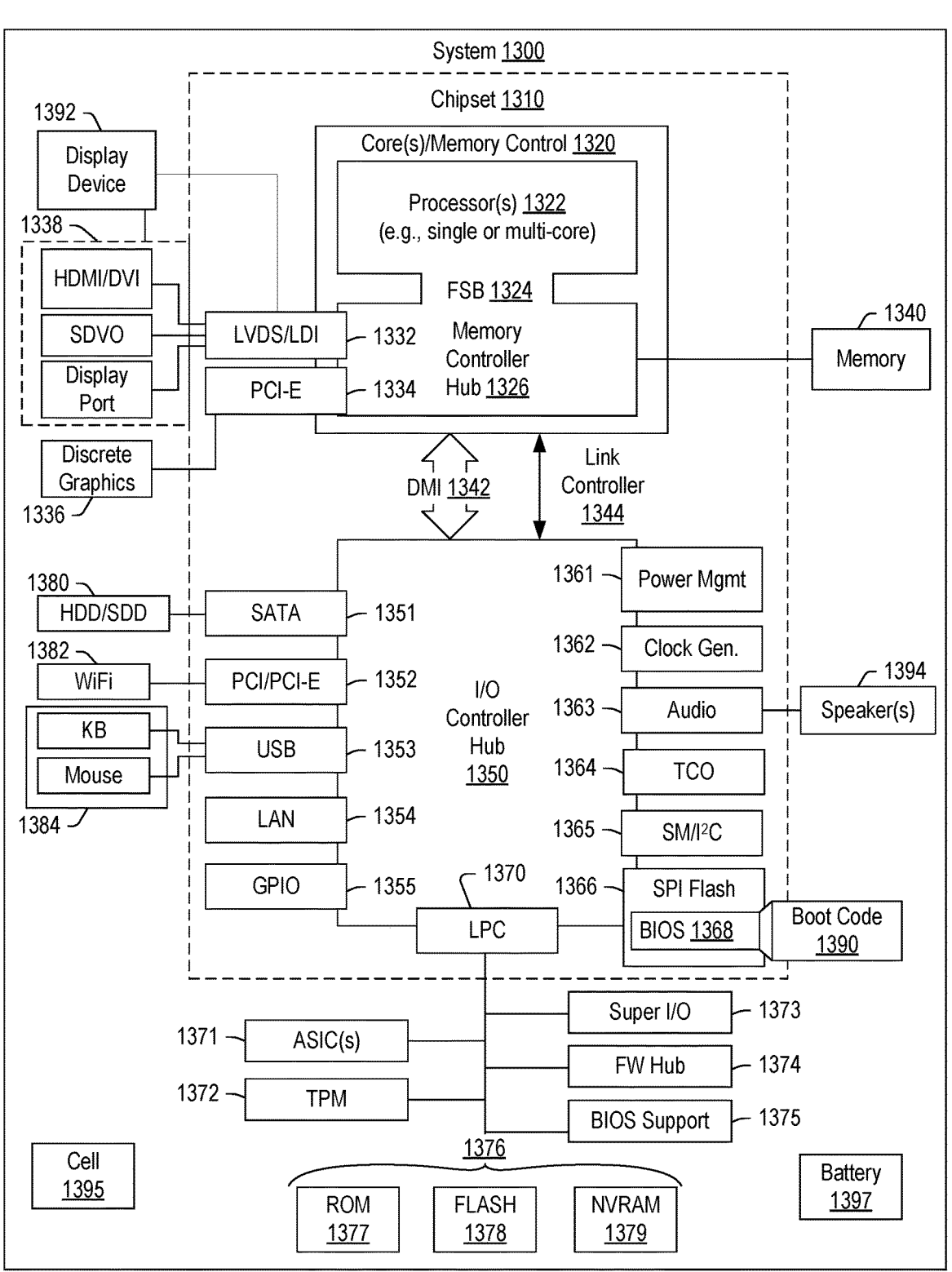
FIG. 13 is a diagram of an example of a system that includes one or more processors.

While various examples of circuits or circuitry have been discussed, FIG. 13 depicts a block diagram of an illustrative computer system 1300. The system 1300 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing system comprising:
a base housing that comprises a base side and an opposing unit recess side that comprises a unit recess that comprises a floor and one or more extended surfaces;

a display housing that comprises a back side and an opposing display side that comprises a display;
a hinge assembly that couples the base housing and the display housing; and
a unit receivable in the unit recess, wherein the unit comprises one or more notches, a physical keyboard side that comprises a physical keyboard and an opposing auxiliary display side that comprises an auxiliary display,
wherein in an upward facing orientation of the physical keyboard side of the unit in the unit recess, the one or more notches receive the one or more extended surfaces to lower the position of the unit with respect to the floor of the unit recess, and
wherein in an upward facing orientation of the auxiliary display side of the unit in the unit recess, the one or more extended surfaces contact the unit to limit the position of the physical keyboard side of the unit with respect to the floor of the unit recess to prevent depression of physical keys of the physical keyboard by the floor of the unit recess.

2. The computing system of claim 1, wherein the unit recess comprises a substantially rectangular opening and wherein the unit comprises a substantially rectangular perimeter.

3. The computing system of claim 1, wherein the base housing comprises an interface and wherein the unit comprises a mating interface.

4. The computing system of claim 3, wherein the mating interface is centered along an edge of the unit.

5. The computing system of claim 1, wherein the base housing comprises an interface and the unit comprises a first mating interface for the physical keyboard and a second mating interface for the auxiliary display.

6. The computing system of claim 1, comprising a latch that releasably secures the unit in the unit recess.

7. The computing system of claim 1, wherein the auxiliary display comprises touch sensing circuitry.

8. The computing system of claim 1, comprising detection circuitry that automatically detects an orientation of the unit in the unit recess.

9. The computing system of claim 8, comprising a processor that selectively receives instructions from the physical keyboard or transmits instructions to the auxiliary display responsive to detection of the orientation of the unit in the unit recess by the detection circuitry.

10. The computing system of claim 9, wherein the processor executes an application to render information to the display and to render information to the auxiliary display simultaneously.

11. The computing system of claim 10, wherein the information rendered to the auxiliary display comprises at least one navigation graphic.

12. The computing system of claim 10, wherein the information rendered to the auxiliary display comprises a graphical keyboard.

13. The computing system of claim 1, wherein the unit seats completely within the unit recess.

14. The computing system of claim 13, wherein, in a closed position of the display housing with respect to the base housing, neither the physical keyboard nor the auxiliary display side contact the display of the display housing.

15. The computing system of claim 1, comprising wireless communication circuitry that operatively couples circuitry of the unit to circuitry of the base housing.

16. The computing system of claim 15, wherein the circuitry of the unit is operatively couplable to the circuitry of the base housing without the unit seated in the unit recess.

17. The computing system of claim 1, wherein the unit comprises a stand for positioning the unit on a surface.

18. The computing system of claim 1, comprising two or more of the units.

19. The computing system of claim 1, wherein receipt of the one or more extended surfaces by the one or more notches lower the position of the unit with respect to the floor of the unit recess to prevent contact between physical keys of the physical keyboard in a closed orientation of the base housing and the display housing.

20. The computing system of claim 1, wherein the physical keyboard comprises a bezel and wherein, in the upward facing orientation of the auxiliary display side of the unit in the unit recess, the one or more extended surfaces contact the bezel unit to limit the position of the physical keyboard side of the unit with respect to the floor of the unit recess to prevent depression of physical keys of the physical keyboard by the floor of the unit recess.

\* \* \* \* \*